United States Patent [19]

Burnett et al.

[11] 4,203,938

[45] May 20, 1980

[54] MANUFACTURE OF POLYTETRAFLUOROETHYLENE TUBES

[75] Inventors: Edward L. Burnett; Eugene V. Stack, both of Bay City, Mich.

[73] Assignee: The Dow Chemical Company, Midland, Mich.

[21] Appl. No.: 703,048

[22] Filed: Jul. 6, 1976

Related U.S. Application Data

[63] Continuation-in-part of Ser. No. 500,801, Aug. 26, 1974, abandoned.

[51] Int. Cl.$^2$ .............................................. B27J 5/00
[52] U.S. Cl. ..................................... 264/127; 264/331
[58] Field of Search ........................................ 264/127

[56] References Cited

U.S. PATENT DOCUMENTS

| | | | |
|---|---|---|---|
| 2,939,178 | 6/1960 | Haroldson et al. | 264/127 |
| 3,140,327 | 7/1964 | Dettmer | 264/127 |
| 3,260,774 | 7/1966 | Harlow | 264/28 |

*Primary Examiner*—Donald J. Arnold
*Assistant Examiner*—James R. Hall
*Attorney, Agent, or Firm*—R. B. Ingraham

[57] ABSTRACT

Polytetrafluoroethylene tubes are prepared by isostatic molding of polytetrafluoroethylene powder over a cylindrical mandrel at a temperature below about 19° C. The compacted preform and mandrel are then warmed to a temperature above about 19° C. and the preform removed from the mandrel. Sticking of the preform to the mandrel is avoided.

2 Claims, No Drawings

MANUFACTURE OF POLYTETRAFLUOROETHYLENE TUBES

This application is a continuation-in-part of our application Ser. No. 500,801 filed Aug. 26, 1974 now abandoned.

One common method of fabricating polytetrafluoroethylene powder is by isostatic molding, that is, the compaction of the powder, oftentimes by a hydraulic fluid against a flexible diaphragm which in turn presses against the powdered polytetrafluoroethylene which is forced against a pattern having a desired surface in the preparation of tubes such as cylindrical tubes. Oftentimes a tapered mandrel is employed in order to facilitate the removal of the compacted hollow cylindrical polytetrafluoroethylene preform from the internal mandrel.

It would be desirable if there were available an improved method for the isostatic molding of polytetrafluoroethylene tubes wherein the polytetrafluoroethylene is compacted about an internal mandrel to form a hollow tube.

It would also be desirable if there were available a method for molding of polytetrafluoroethylene powder which would permit ready removal of compacted preform from a cylindrical internal mandrel.

It would also be desirable if there were available an improved method for the molding of polytetrafluoroethylene tubes in which tubes of relatively long length could be prepared and were readily removable from an internal mandrel.

These benefits and other advantages in accordance with the present invention are achieved in a method for the preparation of a polytetrafluoroethylene tube from polytetrafluoroethylene in a finely divided form, a mandrel of generally constant cross-sectional configuration is provided, polytetrafluoroethylene in finely divided form is disposed about at least a portion of the mandrel, the polytetrafluoroethylene is subsequently pressed against the mandrel with sufficient force to result in a compacted generally coherent compacted polytetrafluoroethylene preform and the preform subsequently removed from the mandrel, the improvement which comprises compacting the polytetrafluoroethylene at a temperature below the first order transition of polytetrafluoroethylene at a temperature of about 19° C., raising the temperature of at least the preform to a temperature above the first order transition at about 19° C. and removing the mandrel from the preform.

The method of the present invention can be used with all finely divided polytetrafluoroethylene compositions suitable for isostatic molding. Such materials are well known and commercially available. The polytetrafluoroethylene compositions exhibit a crystalline transition or a first order transition at a temperature of about 19° C. It is desirable that the polytetrafluoroethylene compositions employed for the practice of the present invention be relatively moisture free, that is, the resins should not be stored under conditions which will permit condensation of moisture within the resins. Generally resins which are stored at a temperature of about 21°–27° C., in an atmosphere of 50 percent relative humidity or less, are suitable for the practice of the invention. If optimum performance is to be obtained, it is frequently desirable to remove moisture from the polytetrafluoroethylene composition by heating to a temperature of about 33° C. in an atmosphere having a relative humidity of about 10 percent moisture for a period of 24 hours before the compositions are used. Such heating can be done in a circulating air oven and the resins are spread to a thickness not exceeding about ¾ inch.

When the finely divided resin composition has been disposed about the mandrel and prior to pressing, it is desirable that the space between a restraining means such as an external rubber tube and the mandrel have air removed in order to eliminate any residual moisture which may be present. Dry nitrogen, if desired, may then be let into the space between the mandrel and the flexible member or rubber tube and the entire assembly cooled at a temperature below about 19° C. Beneficially, temperatures between 15°–17° C. are eminently satisfactory for the compaction of the polytetrafluoroethylene employing the process of the present invention. Although the process is operable at lower temperatures, generally it is economically undesirable to compact the resin at temperatures below that of about 10° C. assuming that normal ambient temperature is about 21°–24° C.

The compaction of the polytetrafluoroethylene may be carried out employing normal pressures generally in the range of about 1,000–10,000 pounds per square inch and beneficially from about 2000–6000 pounds per square inch. After compaction has been completed, the rubber tube surrounding the tubular preform, may be removed and the tubular preform warmed to a temperature of above the first order transition of about 19° C. and the resultant tubular preform is easily removed from the mandrel, assuming that the mandrel is of cylindrical configuration and has a surface finish having a roughness height not greater than 63 microinches (ASA D46.1-1962).

By the way of further illustration, a 1¾ inch steel mandrel was provided having a surface finish of about 35 microinches. The mandrel was surrounded by a flexible rubber tube and was sealed to the mandrel by appropriate collars at each end. One collar had an opening through which a commercially available polytetrafluoroethylene in finely divided form was added. The polytetrafluoroethylene resin was a commercially available variety and sold under the trade designation of du Pont #8. The mandrel, tube and resin was cooled to a temperature of about 16° C. and a hydraulic pressure of 5,000 pounds per square inch applied to the outside of the rubber tube for a period of 2½ minutes. The rubber tube, mandrel and resultant compacted preform were removed from the hydraulic bath and permitted to reach room temperature which was about 23° C. The length of the compacted preform was 13½ inches. The mandrel was removed readily with no indication of sticking or fracture of the preform.

Repetition of the foregoing experiment indicated that it was readily reproducible. Subsequently, three polytetrafluoroethylene preforms were prepared in the foregoing manner and sintered at a temperature of about 366° C. to provide desirable polytetrafluoroethylene tube.

Generally, the method of the present invention is particularly desirable for long tubes, long tubes being tube having a length to ratio of 50:1 or greater and beneficially of 100:1 or greater. When the foregoing procedure is repeated using other polytetrafluoroethylene resins of a suitable grade of isostatic molding. Equally beneficial results are obtained.

As is apparent from the foregoing specification, the present invention is susceptible of being embodied with various alterations and modifications which may differ particularly from those that have been described in the preceeding specification and description. For this reason, it is to be fully understood that all of the foregoing is intended to be merely illustrative and is not to be construed or interpreted as being restrictive or otherwise limiting of the present invention, excepting as it is set forth and defined in the here-to appended claims.

What is claimed is:

1. In a method for the preparation of a polytetrafluoroethylene tube from a polytetrafluoroethylene in a finely divided form suitable for molding, a mandrel of generally constant cross-sectional configuration is provided, polytetrafluoroethylene in finely divided form is disposed about at least a portion of the mandrel, the polytetrafluoroethylene is subsequently pressed against the mandrel with sufficient force to result in a compacted generally coherent compacted tubular polytetrafluoroethylene preform and the preform subsequently removed from the mandrel, the improvement which comprises compacting the polytetrafluoroethylene at a temperature below about the crystalline transition of the polytetrafluoroethylene at about 19° C., raising the temperature of at least the tubular preform to a temperature above the crystalline transition of the polytetrafluoroethylene at about 19° C. and removing the mandrel from the tubular preform.

2. The method of claim 1 wherein the tube has a length to diameter ratio of at least 50:1.